United States Patent [19]

Sparapany et al.

[11] Patent Number: 4,921,904

[45] Date of Patent: May 1, 1990

[54] SUPERABSORBENT POLYMERS

[75] Inventors: John W. Sparapany, Bolingbrook; Dennis P. Bakalik, Woodridge, both of Ill.

[73] Assignee: Nalco Chemical Company, Naperville, Ill.

[21] Appl. No.: 286,106

[22] Filed: Dec. 19, 1988

[51] Int. Cl.$^5$ ................................................ C08F 8/32
[52] U.S. Cl. ............................ 525/329.9; 525/329.5; 525/379; 525/382
[58] Field of Search ........................... 525/329.9, 329.5

[56] References Cited

U.S. PATENT DOCUMENTS

| | | | |
|---|---|---|---|
| 3,669,103 | 6/1972 | Harper et al. | 128/156 |
| 3,670,731 | 6/1972 | Harmon | 604/368 |
| 4,062,817 | 12/1977 | Westerman | 526/271 |
| 4,076,663 | 2/1978 | Masuda et al. | 525/54.31 |
| 4,286,082 | 8/1981 | Tsubakimoto et al. | 526/240 |
| 4,340,706 | 7/1982 | Obayashi et al. | 526/207 |
| 4,654,039 | 3/1987 | Brandt et al. | 526/207 |
| 4,666,983 | 5/1987 | Tsubakimoto et al. | 525/329.9 |

*Primary Examiner*—Joseph L. Schofer
*Assistant Examiner*—T. McDonald, Jr.
*Attorney, Agent, or Firm*—John G. Roberts, Jr.; Donald G. Epple; Anthony L. Cupoli

[57] ABSTRACT

A substantially water-insoluble, slightly cross-linked, partially neutralized, hydrogen-forming polymer composition consisting essentially of (a) from about 50 mole percent to 99.999 mole percent of polymerizable acid group-containing monomers, and (b) from about 0.001 mole percent to 10 mole percent of a water-soluble polyamine;

said hydrogel-forming polymer composition having been formed by reacting a water-soluble acid group-containing vinyl polymer with a water-soluble polyamine at a temperature sufficient to convert the substantial portion of the amino groups of the water-soluble polyamine into amido groups.

2 Claims, No Drawings

SUPERABSORBENT POLYMERS

INTRODUCTION

Water-insoluble hydrogel-forming polymers[1] are materials which are capable of absorbing large quantities of fluids such as water and body waste and which are further capable of retaining such absorbed fluids under moderate pressures. These absorption characteristics of such materials make them especially useful for incorporation into absorbent articles such as disposable diapers. Harper et al; U.S. Pat. No. 3,669,103; Issued June 13, 1972 and Harmon; U.S. patent is 3,670,731; Issued June 20, 1972, for example, both disclose the use of hydrogel, i.e., "hydrocolloid," materials in absorbent products.

[1] also referred to herein as SAP (superabsorbent polymers)

Frequently SAP[1] comprise polymers of polymerizable unsaturated carboxylic acids or derivatives thereof, such as acrylic acid and/or alkali metal and alkyl acrylates. These polymers are rendered water-insoluble by cross-linking the carboxyl group-containing polymer chains using conventional cross-linking agents such as di- or poly-functional monomer materials.

SAP which essentially comprise only cross-linked polymerized unsaturated monomers, and no starch or cellulose moieties, are also known. Such materials are described, for example, in Tsubakimoto et al; U.S. Pat. No. 4,286,082; Issued Aug. 25, 1981; in Westerman; U.S. Pat. No. 4,062,817; Issued Dec. 13, 1977 and in Obayashi et al: U.S. Pat. No. 4,340,706; Issued July 20, 1982. A recent example of SAP and their method of production is disclosed in U.S. No. 4,654,039 the disclosure of which is incorporated herein. These materials are typified by cross-linked polyacrylates which are prepared by copolymerizing acrylic acid and acrylate monomers in relatively high concentration at polymerization temperatures generally above 20° C.

THE INVENTION

The invention comprises a substantially water-insoluble, slightly cross-linked, partially neturalized, hydrogel-forming polymer composition consisting essentially of
(a) from about 50 mole percent to 99.999 mole percent of polymerizable acid group-containing monomers;
(b) from about 0.001 mole percent to 10 mole percent of a water-soluble polyamine,
said hydrogel-forming polymer composition having been formed by reacting a water-soluble acid group-containing vinyl polymer with a water-soluble polyamine or mixtures of polyamines at a temperature sufficient to convert a substantial portion of the amino groups of the water-soluble polyamine into amido groups.

In a preferred embodiment of the invention, there is added to the hydrogel polymer along with the water-soluble polyamine, from about 0.1 to about 8 mole percent a water-soluble monoamine which is also reacted along with the water-soluble polyamine to form amido groups with the acid groups contained in the polymer.

It is important to note the most critical aspect of the invention resides in the reaction of the polyamine, either alone or with the monoamine, with a fully polymerized carboxylic acid containing polymer to produce the cross-linked finished SAP products of the invention.

The prior art, while having alluded to the use of polyamines as cross-linking agents, does so by using them and reacting them during the polymerization of the starting vinyl monomers. See specifically col. 6 and 7 U.S. No. 4,654,039.

Another important feature of the invention resides in the fact that the reaction between the water-soluble polyamine alone or with the monoamine and the carboxylic acid containing polymer is conducted at a reaction temperature sufficient to convert a substantial portion of the amines into the amido groups.

THE STARTING POLYMERS

The substantially water-insoluble slightly cross-linked, partially neutralized, hydrogel-forming polymer materials of this invention are those which are prepared from polymerizable, unsaturated, acid-containing monomers. Thus, such monomers include the olefinically unsaturated acids and anhydrides which contain at least one carbon to carbon olefinic double bond. More specifically, these monomers can be selected from olefinically unsaturated carboxylic acids and acid anhydrides, olefinically unsaturated sulfonic acids and mixtures thereof.

Olefinically unsaturated carboxylic acid and carboxylic acid anhydride monomers include the acrylic acids typified by acrylic acid itself, methacrylic acid, ethacrylic acid, alpha-chloroacrylic acid, alpha-cyano acrylic acid, beta-methyl-acrylic acid (crotonic acid), alpha-phenyl acrylic acid, beta-acryloxy propionic acid, sorbic acid, alpha-chloro sorbic acid, acrylic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitic acid, maleic acid, fumaric acid, tricarboxy ethylene and maleic acid anhydride.

Olefinically unsaturated sulfonic acid monomers include aliphatic or aromatic vinyl sulfonic acids such as vinylsulfonic acid, allyl sulfonic acid, vinyltoluenesulfonic acid and styrene sulfonic acid; acrylic and methacrylic sulfonic acid such as sulfoethyl acrylate, sulfoethyl methacrylate, sulfopropyl acrylate, sulfopropyl methacrylate, 2-hydrocy-3-acryloxy propyl sulfonic acid, 2-hydroxy-3-methacryloxy propyl sulfonic acid and 2-acrylamido-2-methyl propane sulfonic acid.

Of all the foregoing unsaturated, acid-containing monomers, preferred monomers include acrylic acid, methacrylic acid, and 2-acrylamide-2-methyl propane sulfonic acid. Acrylic acid itself is especially preferred.

The hydrogel-forming polymer materials of the present invention must be prepared primarily from the acid group-containing monomers as hereinbefore described. Generally, from about 50 mole percent to 99.999 mole percent, and more preferably from about 75 mole percent to 99.99 mole percent of the hydrogel-forming polymer material will be prepared from such acid group-containing monomers two or more different monomer types of the hereinbefore described acid group-containing monomers may be copolymerized in order to provide hydrogel-forming polymer material of this requisite acid group-containing monomer content.

While at least 50 mole percent of the hydrogel-forming polymer compositions herein mut be prepared from acid group-containing monomers, some non-acid monomers may also be used to prepare the hydrogel-forming polymer compositions herein (prior to neutralization). Such non-acid monomers can include, for example, the water-soluble or water-dispersible esters of the foregoing acid-containing monomers as well as monomers which contain no carboxyl or sulfonic acid groups at all. Optional non-acid monomers can thus include, for example, carboxylic acid or sulfonic acid ester-containing monomers, hydroxyl group-containing monomers, amide group-containing monomers, amino group-containing monomers, nitrile group-containing monomers and quaternary ammonium salt group-containing monomers. These non-acid monomers are well known materials and are described in greater detail, for example, in Masuda et al; U.S. Pat. No. 4,076,663; Issued Feb. 28, 1978, and in Westerman; U.S. Pat. No. 4,062,817; Issued Dec. 13, 1977, both of which are incorporated herein by reference. If present at all, such non-acid monomers will by used only to such an extent that, prior to neutralization, no more that about 50% mole percent of the polymer compositions herein are prepared from such non-acid monomers.

It should be noted that the foregoing optional non-acid monomers include only those monomers which will copolymerize with the essential acid-containing monomers used to prepare the hydrogel-forming polymers herein. The hydrogel-forming polymer compositions of this invention must not, however, contain any significant amount of other moieties, e.g., polymer moieties, onto which the acid group-containing monomers will graft polymerize.

As indicated, these polymers are preferably homopolymers of acrylic or methacrylic acid, although as indicated, they may be formed from other water-soluble vinyl monomers.

Typically, they would have a molecular weight ranging between 10,000 to 500,000 with a preferred molecular weight range being within the range of 50,000–500,000 and preferably 75,000–300,000.

THE POLYAMINES

The polyamines may be selected from a wide group of polyamines which may be either in a preferred embodiment alkylenediamines or in a most preferred embodiment, polyalkylenediamines. Illustrative of such amines are:
Ethylenediamine (EDA)
1,4-Diaminobutane (DAB)
1,8-Diaminooctane (DAO)
Tris(2-aminoethyl)amine (TAEA).

Also usable are the well-known polyalkylene polyamines such as diethylenetriamine, tetraethylene pentamine, and the mixed polyamines prepared by the reaction of ethylene dichloride and ammonia.

As indicated, those polyamines are used singularly or in any ratio with other polyamines in a dosage ranging between 0.001 mole percent up to 10 mole percent. A preferred dosage range is 0.2 to 2.0 mole percent.

The term "polyamine", either in its singular or plural form, includes as equivalents mixtures of such polyamines.

THE WATER-SOLUBLE MONOAMINES

These amines may be either primary or secondary amines but not tertiary amines. Two preferred amines are tertiary butylamine (TBA) and diisopropylamine (DIA). Taurine may also be used as well as ethyl, propyl, butyl amines and the like. The dosage ranges from between 0.1 to 8 mole percent. A preferred dosage is 0.2 to 4.0 mole percent.

METHOD OF PREPARING THE STARTING POLYMERS

These may be prepared using a number of well-known preparative techniques described in the literature. See for instance U.S. No. 4,654,039 and the references cited therein and there against.

The polymerization should be an aqueous solution as opposed to an emulsion or suspension polymerization. As indicated, the polymers should be prepared without any cross-linking agent being present. They are preferably prepared using free radical catalysts which are well-known in such reactions. A typical free radical catalyst is 2,2'Azobis(2amidinopropane) dihydrochloride. The reaction temperature and time will generally depend upon the polymerization employed although as a general rule, the reaction temperature will normally not exceed 120° C.

CROSS-LINKING OF THE WATER-SOLUBLE POLYMER

After the water-soluble polymer is prepared in the form of a solution, it is either diluted or concentrated to provide 5 to 60 percent by weight of polymer, depending upon the molecular weight of the polymer and if a mixable solution exists. To this is added the cross-linking polyamines and optionally the monoamines which are then heated at a sufficient temperature and for a sufficient time to produce substantial amidation of the amines.

As a general rule, the reaction temperature will be at least 150° C. Pressure conditions are preferred to prevent low or volatile ingredients from evaporating.

DESCRIPTION OF THE PREFERRED EMBODIMENTS

The following examples serve to illustrate the present invention without, however, limiting the same thereto.

EXAMPLES

Polymer Preparation
797 g of deionized water were placed in a reactor and purged with nitrogen while heating to 60° C. 3.0 g of 2,2'azobis(2amidinopropane)dihydrochloride were added at once and 200 g of glacial acrylic acid were added dropwise over two hours. After the addition of acrylic acid was complete, the mixture was stirred for an additional hour at 60° C. 156 g of 50% caustic were added to form a 17.3% polymer solids, 70% neutralized polyacrylic acid-soldium acrylate copolymer (PAA). Molecular weight equals 250,000.

EXAMPLE 1

SAP produced by the following method are listed in Table 1. 232 g of PAA were mixed with the requisite amount of crosslinker and then placed in a pressure reactor. The reactor was pressurized to 40–80 psi with nitrogen and heated to 165° C. After four hours at 165° C., the reactor was cooled and the gel removed.

EXAMPLE 2

SAP produced by this method are listed in Table II. 232 g of PAA were mixed with a crosslinker and monoamine such as DIA, TBA and/or taurine. The polymer solution was then placed in a pressure reactor and pressurized to 40–80 psi with nitrogen and heated for four hours at 165° C. After four hours, the reactor was cooled and the SAP gel removed.

SAP PREPARATION

The superabsorbent gel taken from the pressure reactor was cut into small pieces and dried in a vacuum oven set at 180° F. and 22 mm. Hg. The drying period ranged from overnight to 2-3 days depending on when a friable material was obtained. The dry SAP was then ground to a fine powder using a mechanical grinder and subjected to capacity tests.

CAPACITY

A centrifuged tea bag test was used as the standard method of analyzing capacities.

TABLE I

Superabsorbent Polymer Examples

| Example Number | Crosslinker Type | Mole % Crosslinker | Capacity g/g |
|---|---|---|---|
| 1 | EDA | 1.2 | 29.5 |
| 2 | EDA | 0.6 | 35.6 |
| 3 | EDA | 0.4 | 39.6 |
| 4 | EDA | 0.3 | 60.0 |
| 5 | EDA | 0.2 | 42.0 |
| 6 | DAB | 3.5 | 30.4 |
| 7 | DAB | 2.0 | 37.7 |
| 8 | DAB | 1.5 | 39.6 |
| 9 | DAB | 1.0 | 44.0 |
| 10 | DAB | 0.8 | 35.6 |
| 11 | DAB | 0.4 | 33.7 |
| 12 | DAO | 3.5 | 23.5 |
| 13 | DAO | 2.5 | 38.4 |
| 14 | DAO | 1.7 | 32.4 |
| 15 | DAO | 0.9 | 32.3 |
| 16 | DAO | 0.6 | 28.1 |
| 17 | DAO | 0.3 | 20.4 |
| 18 | TAEA | 1.5 | 28.1 |
| 19 | TAEA | 0.6 | 43.7 |
| 20 | TAEA | 0.3 | 50.5 |
| 21 | TAEA | 0.15 | 57.2 |
| 22 | TAEA | 0.075 | 49.1 |
| 23 | EGDE | 2.1 | 21.5 |
| 24 | EGDE | 0.6 | 35.7 |
| 25 | EGDE | 0.3 | 48.8 |
| 26 | EGDE | 0.2 | 55.8 |
| 27 | EDA;DAB | 0.5:0.5 | 46.6 |

TABLE II

Monoamine Superabsorbent Polymer Examples Effects and Salt Effects on Capacity

| Example Number | Crosslinker Type Mole % | Additive Type Mole % | Salt % | Capacity (g/g) |
|---|---|---|---|---|
| 28 | EDA 0.6 | | 0.9 | 35.6 |
| 29 | EDA 0.6 | | 1.59 | 23.6 |
| 30 | EDA 0.6 | | 5.0 | 19.5 |
| 31 | EDA 0.6 | Taurine 0.3 | 0.9 | 38.3 |
| 32 | EDA 0.6 | Taurine 0.3 | 1.59 | 33.3 |
| 33 | EDA 0.6 | Taurine 0.3 | 5.0 | 21.0 |
| 34 | EDA 0.6 | Taurine 0.6 | 0.9 | 37.4 |
| 35 | EDA 0.6 | Taurine 0.6 | 1.59 | 28.7 |
| 36 | EDA 0.6 | Taurine 0.6 | 5.0 | 17.5 |
| 37 | EDA 0.6 | DIA 2.4 | 0.9 | 57.8 |
| 38 | EDA 0.6 | DIA 2.4 | 1.59 | 48.3 |
| 39 | EDA 0.6 | DIA 2.4 | 5.0 | 31.7 |
| 40 | EDA 0.6 | TBA 0.4 | 0.9 | 60.0 |
| 41 | EDA 0.6 | TBA 0.4 | 1.59 | 49.3 |
| 42 | EDA 0.6 | TBA 0.4 | 5.0 | 28.2 |

Having thus described our invention, we claim:

1. A substantially water-insoluble, slightly crosslinked, partially neutralized, hydrogel-forming polymer composition consisting essentially of
   (a) from about 50 mole percent to 99.999 mole percent of polymerizable acid group-containing monomers;
   (b) from about 0.001 mole percent to 10 mole percent of a water-soluble polyamine; and
   (c) from about 0.01 to about 8 mole percent of a water-soluble aliphatic or substituted aliphatic primary or secondary monoamine;
   said hydrogel-forming polymer composition having been formed by reacting a water-soluble acid group-containing vinyl polymer with the water-soluble polyamine and the monoamine at a temperature sufficient to convert a substantial portion of the amino groups of the water-soluble polyamine and monoamine into amido groups.

2. The hydrogel-forming composition of claim 1 wherein the unsaturated polymerizable acid group-containing monomer is acrylic acid, the water-soluble aliphatic or substituted aliphatic primary or secondary amine is from the group consisting of diisopropylamine and tert-butylamine and the water-soluble polyamine is from the group consisting of ethylenediamine, 1,4-diaminobutane, 1,8-diaminooctane and tris(2-aminoethyl)amine.

* * * * *